United States Patent [19]

Schmidt et al.

[11] Patent Number: 5,821,729
[45] Date of Patent: Oct. 13, 1998

[54] METHOD AND DEVICE FOR CHARGE EXCHANGE BETWEEN A PLURALITY OF ENERGY STORES OR CONVERTERS CONNECTED IN SERIES

[75] Inventors: Heribert Schmidt, Emmendingen; Martin Jantsch, Ehrenkirchen, both of Germany

[73] Assignee: Fraunhofer-Gesellschaft Zur Forderung der Angewandten Forschung e.V., Munich, Germany

[21] Appl. No.: 765,608

[22] PCT Filed: Jun. 14, 1995

[86] PCT No.: PCT/DE95/00793

§ 371 Date: Dec. 23, 1996

§ 102(e) Date: Dec. 23, 1996

[87] PCT Pub. No.: WO96/00999

PCT Pub. Date: Jan. 11, 1996

[30] Foreign Application Priority Data

Jun. 29, 1994 [DE] Germany ............................ 44 22 409.5

[51] Int. Cl.⁶ .......................... H01M 10/44; H01M 10/46
[52] U.S. Cl. ................................... 320/6; 320/17
[58] Field of Search ..................... 320/6, 16, 17, 320/18, 65; 323/346

[56] References Cited

U.S. PATENT DOCUMENTS

| | | |
|---|---|---|
| 4,331,911 | 5/1982 | Park . |
| 4,479,083 | 10/1984 | Sullivan ........................ 320/6 |
| 5,177,425 | 1/1993 | Goto . |
| 5,528,122 | 6/1996 | Sullivan . |
| 5,594,320 | 1/1997 | Pacholok et al. ............... 320/4 |
| 5,646,504 | 7/1997 | Feldstein ....................... 320/17 |

FOREIGN PATENT DOCUMENTS

| | | |
|---|---|---|
| 0 432 639 | 6/1991 | European Pat. Off. . |
| 3031931 C2 | 9/1984 | Germany . |
| 1046805 | 7/1983 | U.S.S.R. . |

OTHER PUBLICATIONS

Switched Capacitor System for Automatic Series Battery Equalization by Philip T. Krein and Cesar Pascual; APEC '97 Twelfth Annual Applied Power Electronics Conference and Exposition, vol. 2, pp. 848–855.

*Primary Examiner*—Peter S. Wong
*Assistant Examiner*—Patrick B. Law
*Attorney, Agent, or Firm*—Baker & Daniels

[57] ABSTRACT

A method and apparatus for charge exchange between a plurality of series-connected identical energy storage devices. At least one electric storage device is alternately at a given rate connected in parallel to the energy storage devices. The electric storage device is formed from a transformer winding which is charged by the energy storage devices. Transformer windings are connected in parallel with alternating polarity at the given rate to one of the identical energy storage devices so that all the identical energy storage devices are individually connected in parallel at each step to a transformer winding, thus facilitating direct flow of energy from one of the high-grade energy storage devices to a low-charged energy storage device. The method and apparatus may be used to balance the charges of energy storage devices such as accumulators and of energy converters such as fuel cells.

8 Claims, 8 Drawing Sheets

METHOD AND DEVICE FOR CHARGE EXCHANGE BETWEEN A PLURALITY OF ENERGY STORES OR CONVERTERS CONNECTED IN SERIES

BACKGROUND OF THE INVENTION

The invention concerns a method for charge exchange between a plurality of like energy storage devices or energy converters connected in series so that at least one electric storage device is, at a given rate, connected in parallel to the energy storage devices or energy converters, and wherein each electric storage device is a transformer component charged by the energy storage devices or energy converters, and concerns additionally a device for the application of the method.

Such a monitoring method is known from U.S. Pat. No. 4,331,911 and serves the equalization of voltages of individual series-connected accumulators with a DC-DC converter. The sole central converter for all accumulators is charged by the overall battery and is unable to detect peculiarities of individual accumulators resulting from ageing.

Until the deterioration of such an accumulator in its storing and charging ability is recognized by the monitoring device for accumulators, its malfunction leads to a chain reaction in the group of the accumulators, which also results in a degradation of the other accumulators.

DE-PS 30 31 931 describes a device for extending the discharge time of rechargeable accumulators where the states of charge of the accumulators are detected with a monitoring device. A longer, reliable discharge of the accumulators is accomplished in that the accumulator operation is not terminated upon discharge of the weakest cell, and thus arrival at a limit voltage, but only when this limit voltage is reached at the average of all interconnected accumulators. A service life extension of accumulators in view of their replacement cannot be achieved thereby.

Known from SU 1 065 959 is a device for an accumulator charger that prevents overcharging and charging at inverted polarity of accumulators. The charging current is monitored by a transistor circuit which additionally comprises zener diodes. This safety circuit, however, can guarantee neither a monitoring of the quality of the accumulators nor bring about a longer service life of accumulators degrading in their quality.

Known from EP 90 123 409 of the applicant is a monitoring device for a plurality of series-wired like accumulators where with the aid of a control circuit an electrical storage device is connected in parallel to one of the accumulators, wherein the primary winding of a transformer, in series with a breaker connected to the control circuit, is connected in parallel to the poles of the group of accumulators. The electric storage device is formed always of the secondary winding, which always is connected via a blocking diode to each accumulator. As a difference signal occurs in the control circuit, a function generator is via a comparator circuit turned on between the accumulators, the output of which generator is connected to the breaker. This makes it possible to supply energy to exactly the weakest accumulator. For small applications, this system has the disadvantage of a plurality of control components representing a cost factor and, as the case may be, a space and weight factor. Besides the appreciable expense for selecting the respective weak or strong cell, the performance range of the blocking converters used is upwardly limited.

SUMMARY OF THE INVENTION

In view of this prior art, the objective underlying the invention is to provide a method of the initially mentioned type where the replacement of an accumulator degraded in its quality can be delayed at reduced wiring expense as compared to the prior art.

According to the invention, this objective is met by connecting the transformer components at the stated timing rate in parallel to one of the like energy storage devices or energy converters, so that all like energy storage devices or energy converters are, in at least one timing step, connected in parallel, each individually, to a transistor component in the same winding sense.

Opening and closing at a switching frequency, e.g., in the kilohertz range, the breakers form together with the transformer a transformer coupling and thus a virtual parallel circuit of the series-connected energy stores, mostly accumulators. A charge exchange, direct and targeted, takes place then via the transformer coupling, in the weakest of the accumulators, without requiring any decoupling of the other accumulators from the transformer with the aid of switches and a comparator circuit, so that the desired current flow proceeds from the stronger accumulators directly to the weak accumulator, backing its charge.

This objective is inventionally met for a device in that the transistor components are by the switches activated by the clock generator connected in parallel to one each of the like energy storage devices or energy converters, so that all like energy storage devices or energy converters are, in at least one timing step, wired in parallel, each individually, to a transformer component in the same winding sense.

This results in setting up a virtual parallel circuit of the actually series-connected storage devices, cells or accumulators, so that upon occurrence of voltage differences between individual cells a balancing current automatically flows between the cells and without any further selection of the cells or control. As a result, the variations of cell voltages among one another become zero. Contrarily, in the prior art according to U.S. Pat. No. 4,331,911, the transformation ratio of the transformer used has exactly been so chosen, in order to avoid currents flowing in the circuit, that the voltages induced on the secondary side are always somewhat lower than the average battery voltage. As a result, due to the blocking effect of the diodes, only a distinct voltage difference between a fictitious average cell and the qualitatively degraded cell can lead to a current flow to this respective cell.

With the device proposed here, the energy is not drawn from the overall battery or overall arrangement but, due to the magnetic coupling of all windings via the common core and due to the synchronous switching of all windings, the direct flow of current from cells of higher voltage to such with lower voltage is possible.

BRIEF DESCRIPTION OF THE DRAWINGS

The following illustrates with the aid of the drawings in greater detail seven exemplary embodiments of the invention, the drawings showing in FIG. 1, a section of a wiring diagram of a device for charge equalization in three accumulators illustrated in this section, according to a first exemplary embodiment.

BRIEF DESCRIPTION OF THE PREFERRED EMBODIMENTS

Possible, of course, are many realization options for circuits for the application of the method, of which three are illustrated hereafter. Selected, furthermore, are two options for cascade wiring of a larger number of accumulators 1, here connected according to FIG. 3, and for not dropping the transformer coupling across all accumulators 1.

Figure 1:
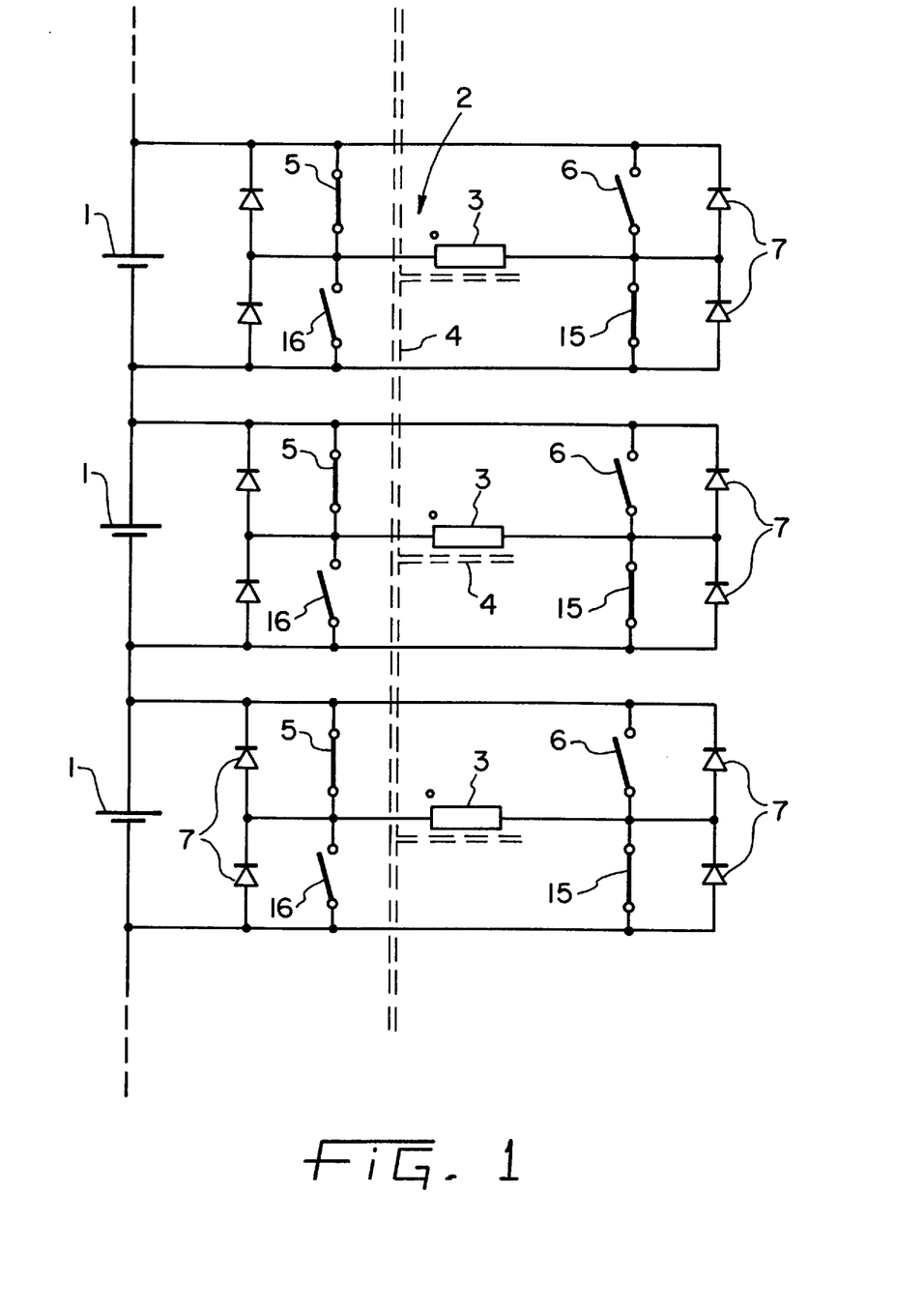

FIG. 1 shows a section of a wiring diagram of a device for charge equalization in three accumulators 1 illustrated in this section, according to a first exemplary embodiment. These accumulators may form an individual group of three accumulators 1 or, as indicated by dashed lines, may be part of a larger battery bank comprising, e.g., 10 to 12 accumulators 1. Besides accumulators 1 as energy storage devices, the device can be employed also with energy converters such as fuel cells.

A transformer 2 is provided that features here three identical windings 3, all of which are arranged on a common core 4 in close magnetic coupling in the same directional sense, indicated by the dot. Thus, one winding 3 forming a storage device is always coordinated with an accumulator 1. Owing to this common winding on a common core 4, viewed technically, a maximum number of windings 3, and thus of accumulators 1 is preset that can be connected to one another via the single core 4. If a larger number of accumulators 1 is to be combined, it is necessary to use a cascading, e.g., according to the principle shown in FIG. 4.

The windings 3 are now connected, with the aid of switch pairs 5, 15 and 6, 16, at a keying ratio of less then 50%, alternately to the poles of the pertaining accumulator 1. The switches 5, 6, 15, 16 are shown in the timing step in which the switches 5 and 15 are closed, so that the winding leader is always connected to the pole of each accumulator 1 shown at the top of FIG. 1. In the next, not illustrated, timing step the switches 6 and 16 close, whereas the switches 5 and 15 are open, so that each winding 3 is connected in a direction of different polarity in parallel to its accumulator 1.

The switches 5, 6, 15 and 16 are connected each to the respective outputs of a clock generator, which is not illustrated in the drawing and is able to generate a clock frequency of preferably more than 20 kHz.

Owing to the close magnetic coupling, the same voltage is induced in all windings 3, notably in the three windings 3 shown here. If one accumulator 1 carries a lower voltage, due to ageing or other effects, an appropriate current flows directly to this cell.

The circuit described so far is fully functional. Preference is given, however, to connecting additionally the diodes 7 illustrated in FIG. 1 via the switches 5, 6, 15 and 16, causing them to briefly receive, as freewheeling diodes, any current that might flow, since a short timing pause is required in cycling, in order to avoid short circuits across simultaneously conducting switches.

The wiring principle relative to FIG. 1 requires for n accumulators 1 n windings 3 and 4×n switches 5, 6, 15, 16.

Figure 2:
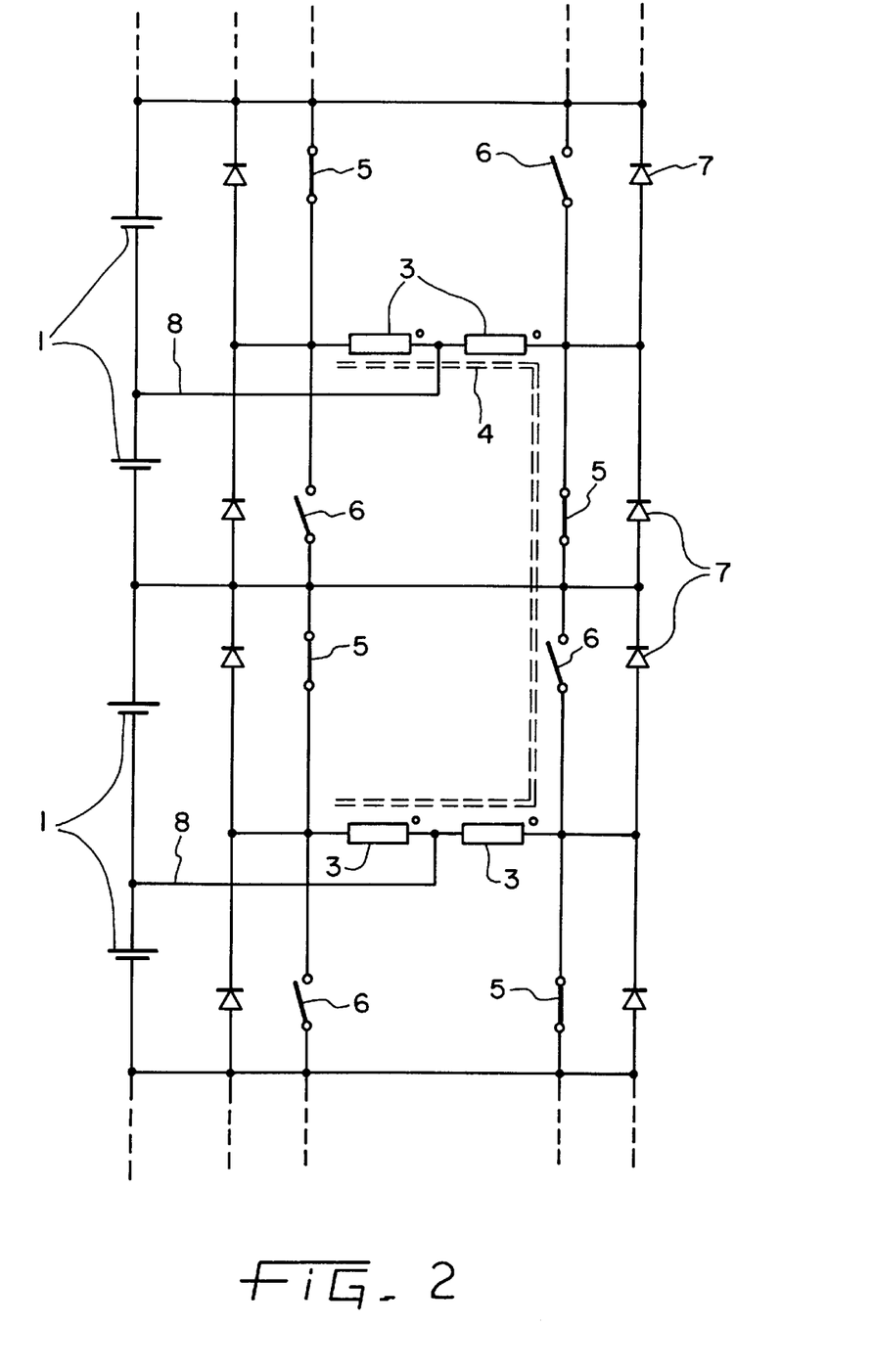
FIG. 2, a section of a wiring diagram of a further device for charge equalization in four accumulators illustrated in this section, according to a second exemplary embodiment.

FIG. 2 shows a section of a wiring diagram of a further device for charge equalization in four accumulators 1 illustrated in this section, according to a second exemplary embodiment. Identical features are referenced identically in all figures. The circuit relative to FIG. 2 concerns an exemplary embodiment for an even number of accumulators 1. Of these accumulators 1, always arranged in twosomes, two pairs are illustrated in FIG. 2. As can be seen readily, this circuit requires for n accumulators 1 also n windings 3, but only 2×n switches 5 and 6.

In this wiring the same winding 3 is no longer connected to the accumulator 1 at inverted polarity in the two timing steps, but two accumulators 1 are coordinated jointly with two windings 3 that are connected alternately to the two accumulators 1, wherein the polarity of the winding 3 is reversed between the two accumulators 1 in the activation, due to the common center tap 8 between the accumulators 1. The diodes 7 are provided again to protect the circuit.

Figure 3:
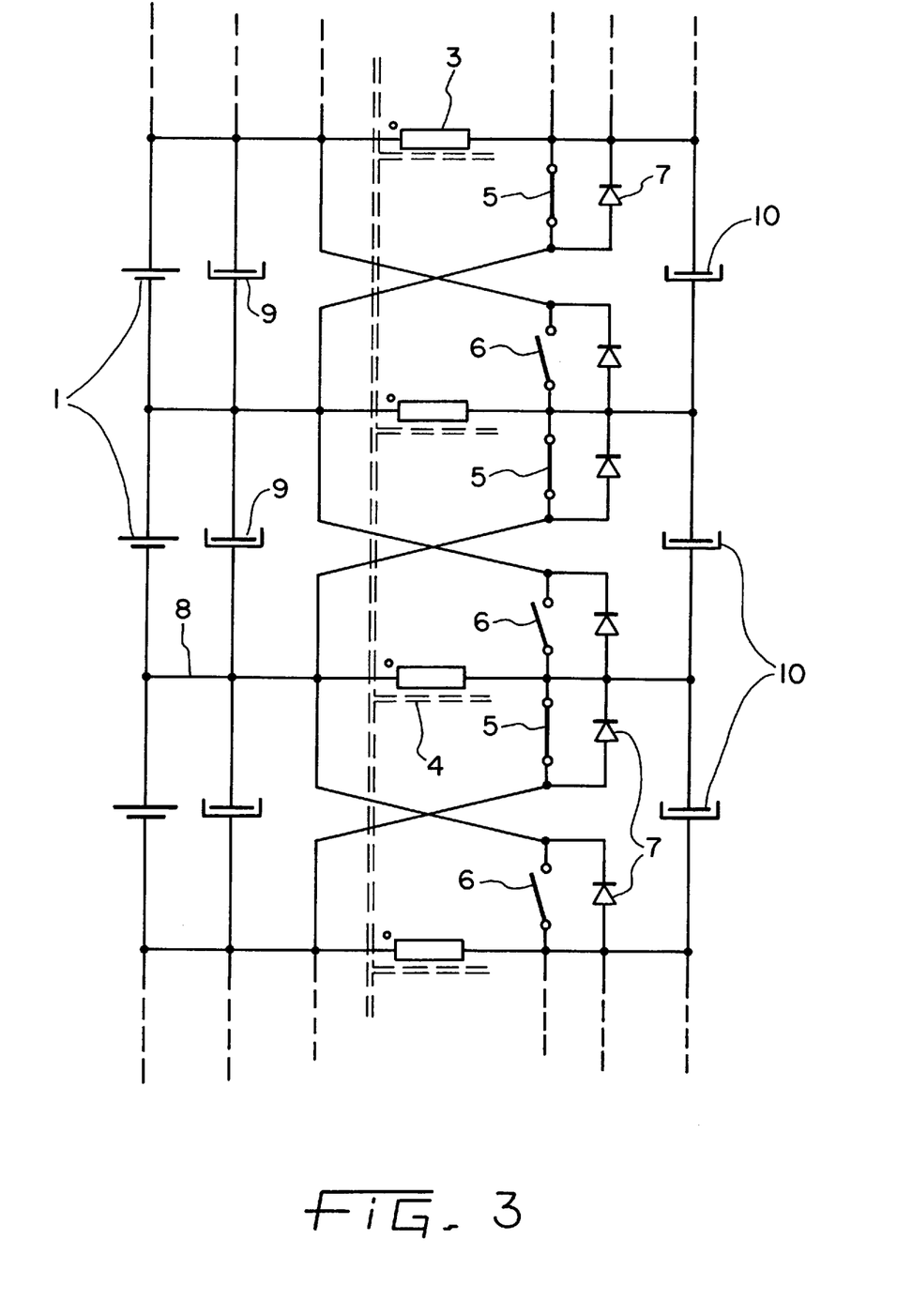
FIG. 3, a section of a wiring diagram of a further device for charge equalization in three accumulators illustrated in this section, according to a third exemplary embodiment.

FIG. 3 shows a section of a wiring diagram of a further device for charge equalization in three accumulators 1 illustrated in this section, according to a third exemplary embodiment, which is the preferred embodiment of the circuit. In realizing it, n+1 windings and 2×n switches are necessary for n accumulators. The windings 3 are coordinated each with two accumulators 1, of adjacent arrangement in FIG. 3. Of course, this is not necessary, but it must remain guaranteed that each winding 3 is coordinated with two accumulators 1 at different polarity and that to each accumulator 1 there are two windings connected with opposite polarity. Naturally, adjacent accumulators are particularly suited, since a simple "flip-over" of the winding 3 about the center tap 8 is possible then in order to generate the alternating voltage necessary for the transformer 2, and since exactly only this device allows using the said small number of switches 5 and 6.

Since each winding 3 interacts with the two adjacent accumulators 1, the top winding 3 and respectively the bottom winding 3, idle alternately depending on the state of the switch.

FIG. 3, moreover, shows the use of capacitors 9 for suppression of high-frequency interference voltages in the leads of the accumulators 1. These smoothing capacitors 9 are favorably used also in the circuits according to FIG. 1 and 2; they have been omitted there for the sake of clarity. The further capacitors 10 serve to receive the energy stored in scatter inductances and to return it without loss. Thus, the circuit is able to manage the occurrence of voltage peaks easily.

Figure 4:
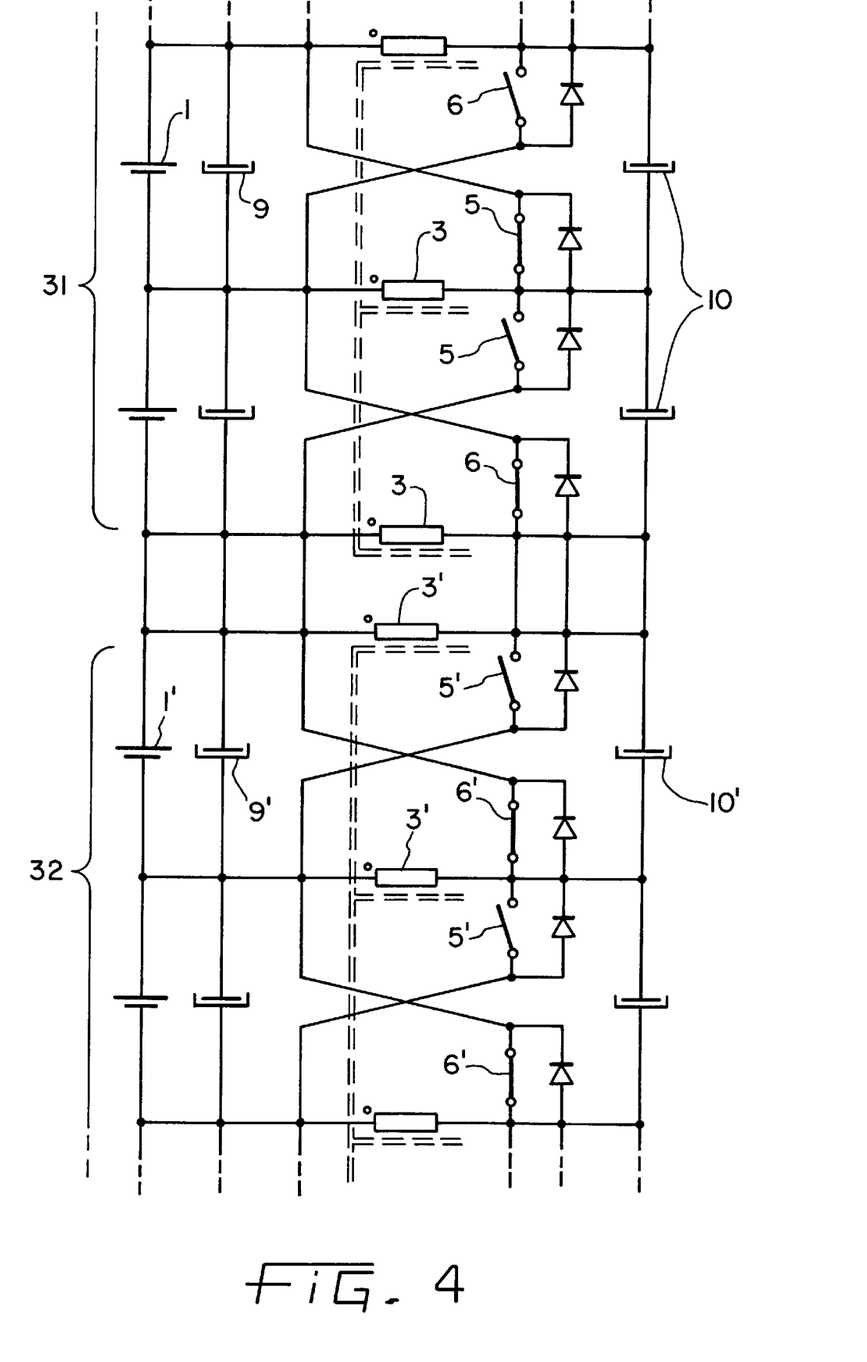
FIG. 4, a section of a wiring diagram of a device for charge equalization in two groups of accumulator groups connected in accordance with FIG. 3, according to a fourth exemplary embodiment.

FIG. 4 shows a section of a wiring diagram of a device for charge equalization in two groups 31 and 32 of accumulator 1 groups connected according to FIG. 3, in accordance with a fourth embodiment. The components of the second group 32, contrary to the first group 31, are identified using prime references.

As explained already at the start of the figures description, the number of windings 3 that are wound on the common core 4 entails technical problems with a larger number of such windings 3, which are present essentially proportionally to the number of accumulators 1 to be connected.

Component systems must then be used wired, e.g., according to one of FIG. 1 through 3, which then are suitably connected to one another, that is, transformer-coupled. FIG. 4 shows a first embodiment of such cascading. Illustrated partially are two accumulator groups 31 and 32, which at the connecting point are arranged in a chain structure, with points of same potential being connected to one another. Besides, care must be taken, of course, that the switches 5 and 5', or 6 and 6', are activated in synchronism.

Owing to the parallel wiring of the two component windings 3 and 3' at the coupling point, both have identical voltages, so that upon occurrence of a voltage difference between the two component groups 31 and 32 a balancing current can flow at that spot. Always the last, or first, switch 6 or 5' ensures that the transformer 2 is coupled to the transformer 2', that the battery bank of the first group 31 is thus connected to the battery bank of the second group 32.

Figure 5:
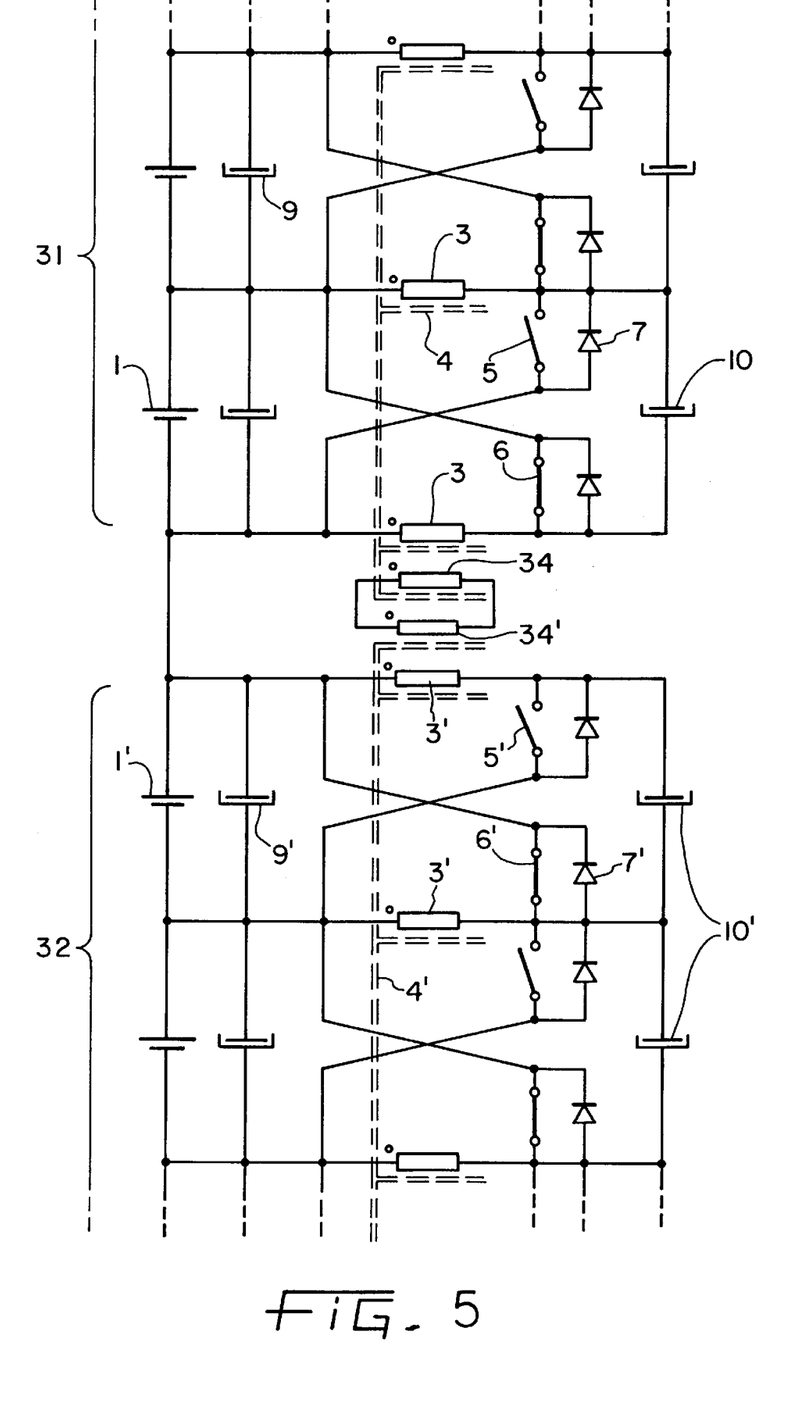
FIG. 5, a section of a wiring diagram of a device for charge equalization in two groups of accumulator groups connected in accordance with FIG. 3, according to a fifth exemplary embodiment.

FIG. 5 shows a section of a further wiring diagram of a device for charge equalization in two groups 31 and 32 of accumulator groups connected in accordance with FIG. 3, according to a fifth exemplary embodiment. As opposed to the wiring according to FIG. 4, a further winding 34, or 34', is provided here on the core 4 or 4', respectively, which then is wired in parallel with all others. FIG. 5 shows this realization for only two windings 34 and 34'. Resulting is a star coupling through which a balancing flow of energy is possible between component systems. The disadvantage of the additional windings 34 or 34' on the common cores 4 or 4' is offset by the advantage that a direct energy flow is possible from any accumulator group to any other accumulator group. The same as in the wiring according to FIG. 4, an exact synchronization of the switching of all switches 5 and 5', or 6 and 6' (and possibly further witches 5 or 6) is necessary also here in the wiring according to FIG. 5, and thus of the clock generator(s).

Figure 6:
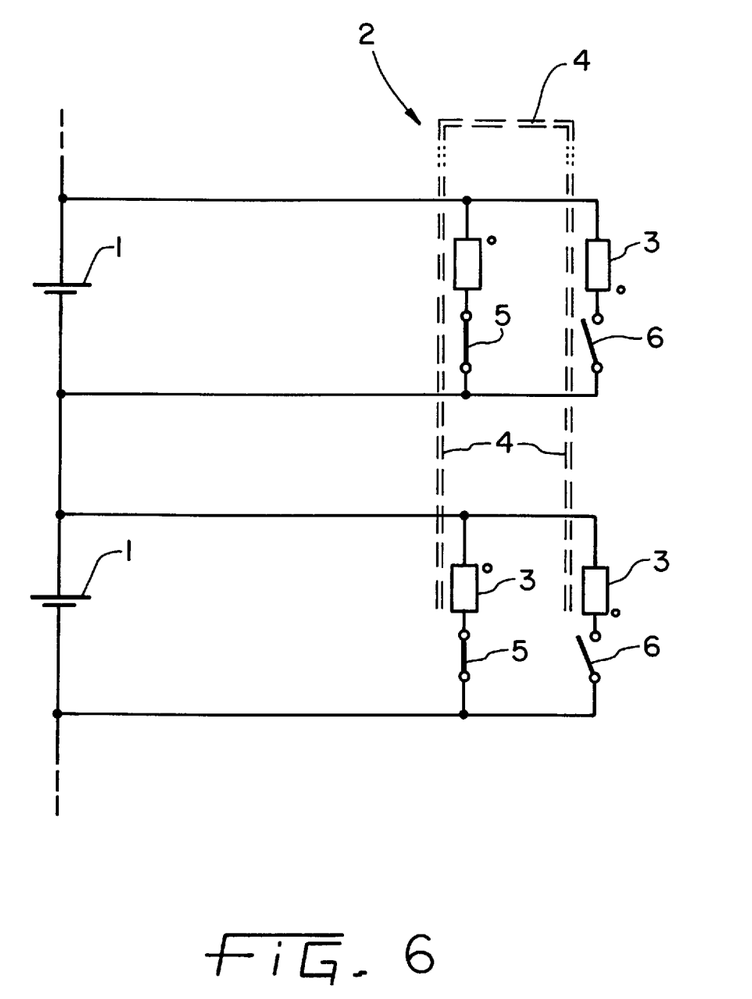
FIG. 6, a section of a wiring diagram of a further device for charge equalization in two accumulators illustrated in this section, according to a sixth exemplary embodiment.

FIG. 6 shows a section of a wiring diagram of a further device for charge equalization in two accumulators 1 illustrated in this section, according to a sixth exemplary embodiment. For reason of simplification, the diodes 7 as well as capacitors 9 and 10 shown in the other figures have been omitted in this wiring, since they are not necessary to understand the operating mode of the circuit. Illustrated are two series-wired accumulators 2 which are part of a battery bank comprising a plurality of accumulators. Two windings 3 with different winding sense are assigned to each of the accumulators 1. These windings 3 are each connected in series with one switch 5 or 6 in a different winding sense as regards their connection to the accumulator 1. They are arranged on a common core 4.

Due to the successive closing of the switches 5 or 6 at the said keying ratio of less than 50%, each of the two windings 3 assigned to an accumulator 1 is always connected in parallel to the accumulator 1, with all accumulators being connected virtually in parallel. In this exemplary embodiment, 2×n windings and 2×n switches are needed for n accumulators.

Figure 7:
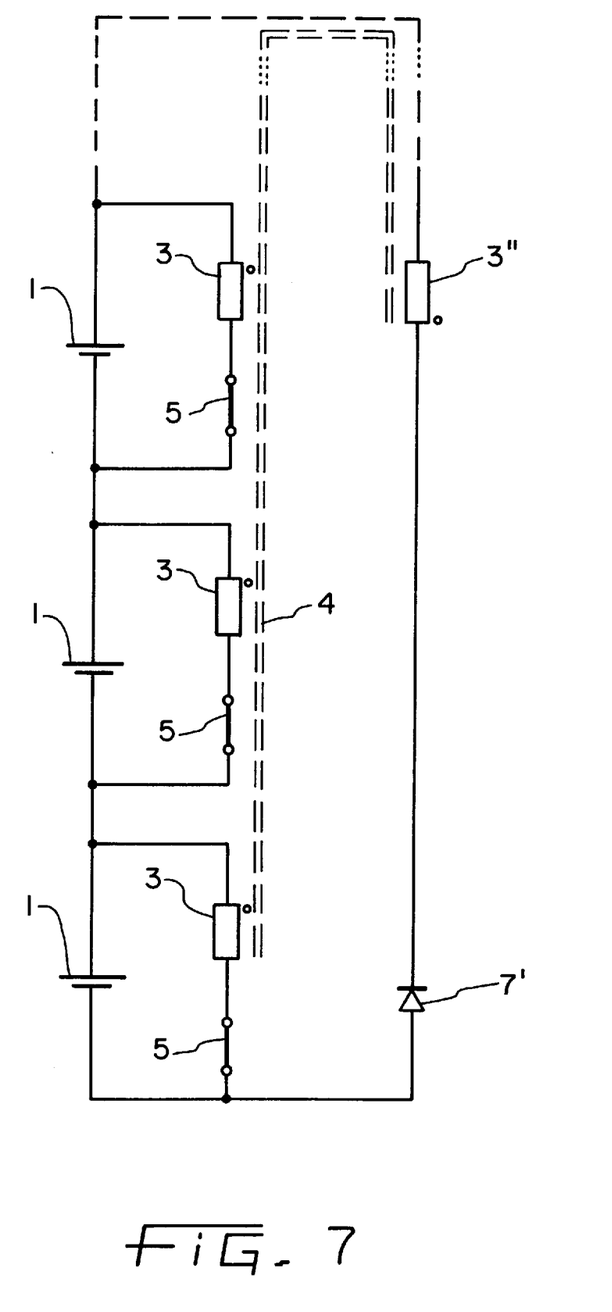
FIG. 7, a section of a wiring diagram of a further device for charge equalization in three accumulators illustrated in this section, according to a seventh exemplary embodiment.

FIG. 7 shows a section of a wiring diagram of a further device for charge equalization in three accumulators illustrated in this section, according to a seventh exemplary embodiment. This FIG. 7 resembles the device according to FIG. 6, the windings 3 connected in the same directional sense to the accumulator 1 and provided with a switch 5 each, whereas a demagnetizing winding 3" common to all accumulators 1 is provided here for the second timing period, which demagnetizing winding is connected via a diode 7' across the overall battery. The actual charge exchange takes place here in the cut-in phase in the first timing period. With a suitable selection of windings 3 and 3", said period may amount also to more than 50% of a cycle, since the demagnetization can take place quickly. This exemplary embodiment requires n+1 windings and only n switches for n accumulators. A cascade or star coupling of component systems is possible also in the exemplary embodiments according to FIGS. 6 and 7.

Figure 8:
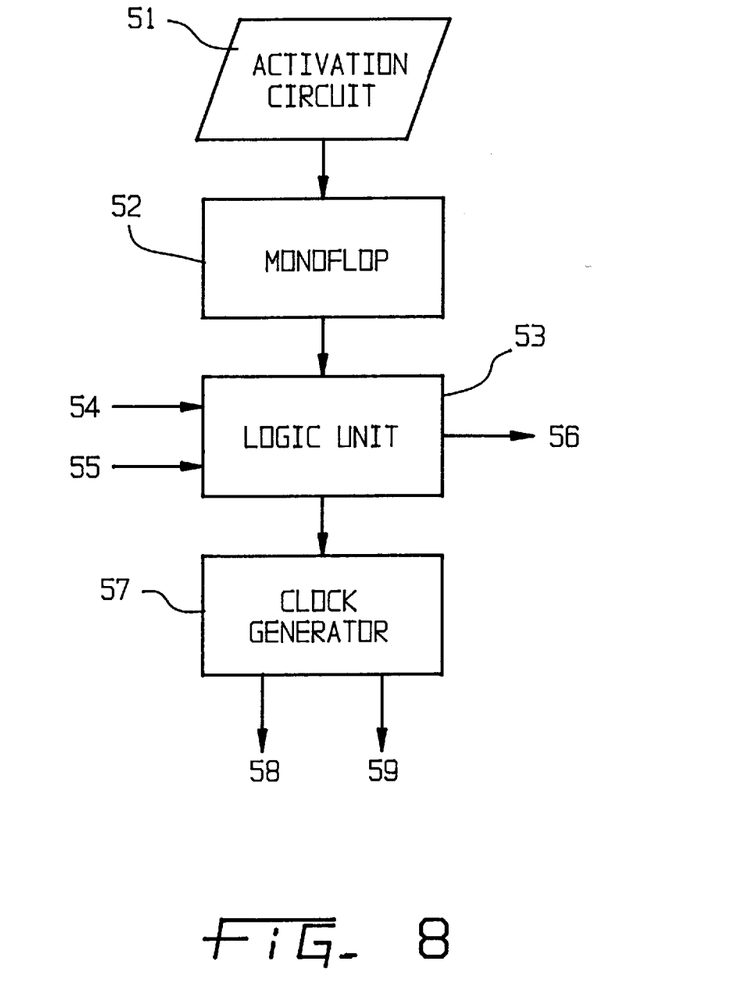
FIG. 8, a block diagram of a sequence control for a device for charge equalization according to one of the exemplary embodiments.

FIG. 8 shows a block diagram of a sequence control for a device for charge equalization according to one of the exemplary embodiments. An activation circuit 51 is provided, which can be triggered by a plurality of events, depending on the intended application. Concerned may be a simple manual on-off switch that may be formed, e.g., by the equivalent of an ignition lock in an accumulator-powered vehicle.

The circuit may also feature a voltage comparator which passes a switching pulse to the output of the circuit as the absolute value of the battery voltage ranges within, or better without, predetermined values. With a lead accumulator 1, said values could range, e.g., at a voltage higher than 2.2 volts or lower than 1.95 volts. A voltage of an accumulator 1 outside these values allows to infer a charging or discharging process in which the charge equalization should take place.

It would also be possible to provide a detector suited for determining a dynamics of the battery voltage that points to quick load changes, such as occur in the operation of an electric vehicle. Moreover, the deviation of the voltage of individual accumulators 1 from a momentary average of the overall system could also be provided as a trigger for the activation circuit 51. Lastly, the circuit for charge equalization can also run, e.g., periodically, for example, every three hours.

When the activation circuit 51 generates a start pulse according to one of the above conditions, which can be checked individually but also several at one time, said pulse activates, e.g., a monoflop 52 that turns the device on for charge exchange for a predetermined time, e.g., for one-half hour, or this duration is determined by a feature of the connected load. The device is monitored by a logic unit 53 to which further signals 54 and 55 are transmitted for detection of an overcurrent or excess temperature in components such as transistors or windings. This circuit 53 may also feature an output 56 for display of status or control signals, for instance, for load dumping. Said logic unit 53 activates the clock generator 57, to the outputs 58 and 59 of which the control inputs of switches 5 or 6 are connected.

We claim:

1. Method for charge exchange between a plurality of series-connected like energy storage devices, wherein an electrical storage device is connected in parallel to each of the said plurality of energy storage devices at predetermined time intervals, each said electrical storage device comprising a plurality of transformer windings charged by the said energy storage devices, each said transformer winding connected in parallel to one of said energy storage devices, so that each energy storage device is simultaneously respectively connected in parallel, in the same winding sense, to a transformer winding.

2. Method according to claim 1, characterized in that the transformer windings are connected in parallel at alternating polarity to one of the said energy storage devices, so that all said energy storage devices are individually connected in parallel at each predetermined time interval, to one transformer coil in the same winding sense.

3. Method according to claim 2, wherein two transformer windings are associated with a first energy storage device, all said transformer windings arranged on a common core, each said two transformer windings simultaneously assigned, to a second said energy storage device, said two transformer windings are connected in parallel at the same polarity to said first energy storage device at each alternate time interval and connected at inverted and unchanging polarity to said second energy storage device at the remaining time intervals.

4. Method according to claim 2, wherein all said transformer windings are arranged on a common core, and the transformer windings are connected in parallel, at said time intervals and at alternating polarity, to the associated energy storage devices by means of a plurality of switch pairs.

5. Method according to claim 1 wherein a plurality of series-connected like energy storage devices are arranged in groups of energy storage devices whose associated transformer windings are arranged on a common core, and wherein two transformer end windings each or two further transformer windings not assigned to an energy storage device are coupled.

6. Apparatus for charge exchange between a plurality of series-connected energy storage devices forming an overall energy storage device, said apparatus comprising an electric storage device, a clock, and switch means connecting said electric storage device in parallel with said plurality of energy storage devices, said electric storage device comprising a plurality of transformer windings charged by said energy storage devices, each said transformer winding respectively connected in parallel, by said switch means to one of the said energy storage devices at predetermined times under control of said clock, so that each said energy storage device is connected in parallel in the same winding sense, to a transformer winding at predetermined intervals.

7. Apparatus according to claim 6, wherein said transformer windings are connected in parallel, by said switch means, at alternating polarity to one each of said storage devices so that each said energy storage device is respectively connected in parallel in the same winding sense to a transformer winding.

8. Apparatus according to claim 6 wherein the clock is activated by a sequence control circuit which is turned on by way of an activation circuit for one of a predetermined period and a period predetermined by a connected load.

\* \* \* \* \*